Aug. 23, 1966  R. W. COOK ET AL  3,267,504
PIPE CLEANING APPARATUS
Filed June 1, 1964  3 Sheets-Sheet 1

INVENTORS.
ROBERT W. COOK and
LEE F. McBRIDE
BY
Lockwood, Woodard, Smith & Weikart
Attorneys Aug. 23, 1966  R. W. COOK ETAL  3,267,504
PIPE CLEANING APPARATUS Filed June 1, 1964  3 Sheets-Sheet 2

INVENTORS.
ROBERT W. COOK and
BY  LEE F. McBRIDE

Lockwood, Woodard, Smith & Weikart
Attorneys

INVENTORS.
ROBERT W. COOK and
LEE F. McBRIDE
BY Lockwood, Woodard, Smith & Weikart
Attorneys

United States Patent Office 3,267,504
Patented August 23, 1966

3,267,504
PIPE CLEANING APPARATUS
Robert W. Cook and Lee F. McBride, Decatur, Ind.,
assignors to C. W. Fuelling, Inc., Fort Wayne, Ind.,
a corporation of Indiana
Filed June 1, 1964, Ser. No. 371,463
4 Claims. (Cl. 15—104.14)

This invention relates generally to an apparatus for cleaning the interior surfaces of an underground pipeline and more particularly to a method and apparatus for locating joints in underground pipelines, removing dust and other foreign matter from the internal pipe surfaces adjacent to a located joint, applying a solvent to said surfaces, scrubbing said surfaces and subsequently drying said surfaces.

In my United States Letters Patent No. 2,894,539, granted July 14, 1959, for "Pipe Sealing Apparatus and Method," there is described apparatus adapted to be moved through an underground pipeline, to locate one joint after another in the pipeline, and to apply a plastic sealing material to the pipe surfaces adjacent to and covering each located pipe joint. The apparatus disclosed in my patent has been used extensively for sealing underground pipe joints and experience shows that underground gas pipes contain a substantial amount of dust, rust, tar and oil. Various techniques and apparatus have been developed for removing dust and rust, but these techniques and apparatus have not proved satisfactory for removing oil films from interior pipe surfaces. Unless such oil film is removed sealing material cannot be successfully applied to the pipe joint to effect a permanent seal. This is because the sealing material does not adhere to a pipe surface having a film of oil thereon.

Accordingly, the principal object of this invention is to provide an apparatus adapted to locate underground pipe joints from a remote point, scour the interior pipe surface adjacent to the located joint, simultaneously apply a quantity of solvent material to said surfaces, and subsequently dry said surfaces.

Another object of this invention is to provide an apparatus adapted to be moved through an underground pipeline, to locate one pipe joint after another, to clean each joint after it is located and to control the operation of the apparatus at a point remote from said apparatus.

In accordance with this invention there is provided apparatus for locating and cleaning underground pipe joints comprising a frame structure, a reservoir for storing a quantity of cleaning fluid supported within said frame structure, a rotatable scouring device mounted at one end of said frame structure, means for rotating said device, said scouring device including means for directing jets of fluid or air on to the surfaces being scoured, means for conducting fluid and air to said jet means, and remote control means for initiating and stopping flow of fluid and air to said jet device.

The full nature of the invention will be understood from the accompanying drawings and the following description and claims:

Figure 1:
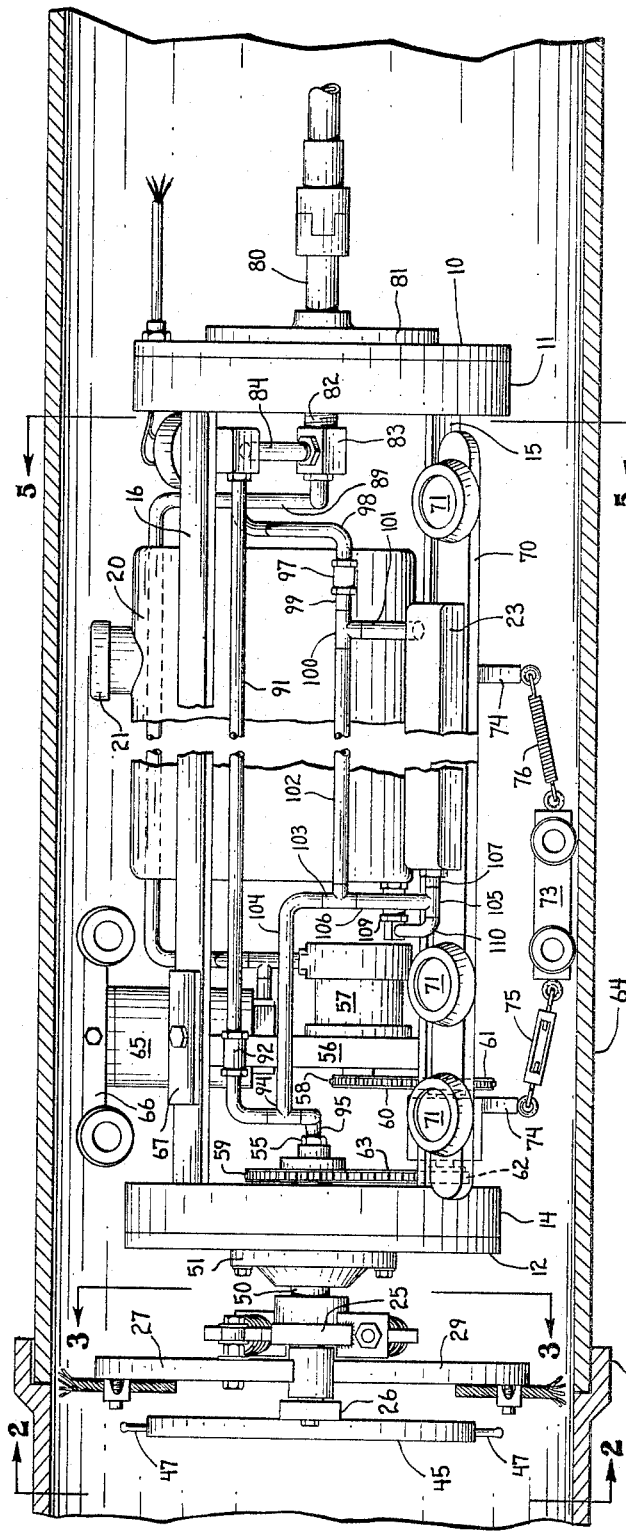
FIG. 1 is a side elevation of the apparatus provided in accordance with this invention illustrating its operative position within the pipe.

The pipe cleaning apparatus, as provided in accordance with this invention, comprises a frame structure (FIG. 1) consisting of a rear-end frame in the form of a disc 10 and a circular collar 11 attached thereto by bolts or welding or other suitable means and a front-end frame consisting of a disc 12 and a circular collar 14 bolted, welded or otherwise fastened to the disc. The end frames are spaced from and attached to one another by four or more longitudinal struts 15, 16, 17 and 18.

For containing a supply of solvent there is provided a tank 20 having a fill cap 21 and supported by any suitable means (not shown) from the longitudinal struts 15, 16, 17, 18. A reservoir 23 for containing a measured quantity of solvent may similarly be supported in any suitable manner from the longitudinal struts. As will be explained, reservoir 23 may be filled from the supply tank 20 and then discharged for applying a predetermined quantity of solvent to the pipe joint which is to be cleaned. A solvent in the form of a chlorinated hydrocarbon presently available under the name "Chlorothene" has been found to have the desirable properties for removing oils and other materials commonly deposite in gas mains.

Figure 2:
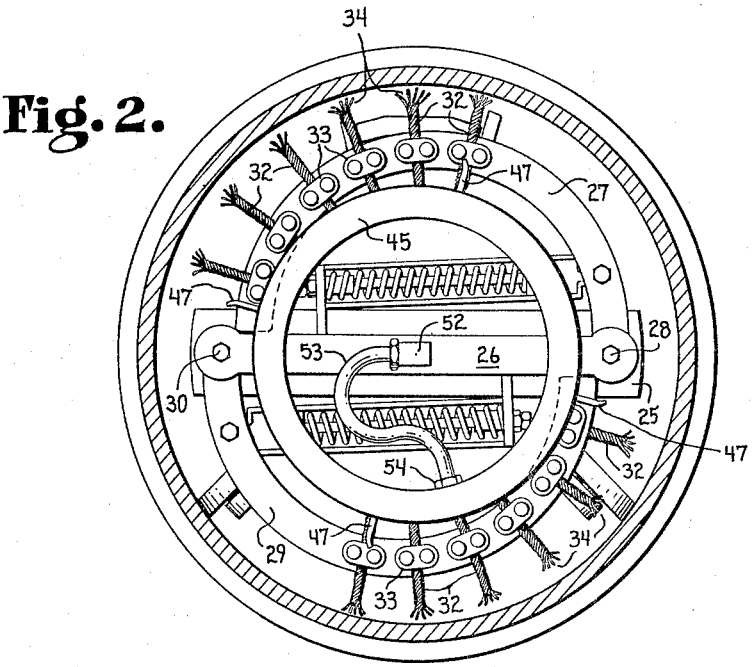
FIG. 2 is an end view taken on line 2—2 of FIG. 1.

A rotatable brush structure and fluid distributing manifold is rotatably mounted to the front-end frame 12, 14 for cleaning the pipe joints. This rotatable structure consists of a pair of parallel plate members 25 and 26. A first curvilinear brush arm 27 is pivotally mounted between the righthand ends (FIG. 2) of plates 25 and 26 by means of a bolt or machine screw 28 which would be provided with a cylindrical bearing on which arm 27 may pivot. A second curvilinear brush arm 29 may be pivotally mounted between the lefthand ends (FIG. 2) of plates 25 and 26 by means of a machine screw or bolt 30 in the same manner as previously described in connection with arm 27. Each of the arms 27 and 29 is provided with a plurality of radially disposed brush elements 32 formed of conventional wire cable. Each of the brush elements may be clamped to arms 27 or 29 by means of conventional cable clamps 33. As illustrated in FIGS. 1 and 2 the outer end of the brush members may be untwisted to some degree, as illustrated at 34, so that the individual wires of the cable are spread apart to form a brush. Also, each brush element is long enough so that it may be adjusted to compensate for wear.

Figure 3:
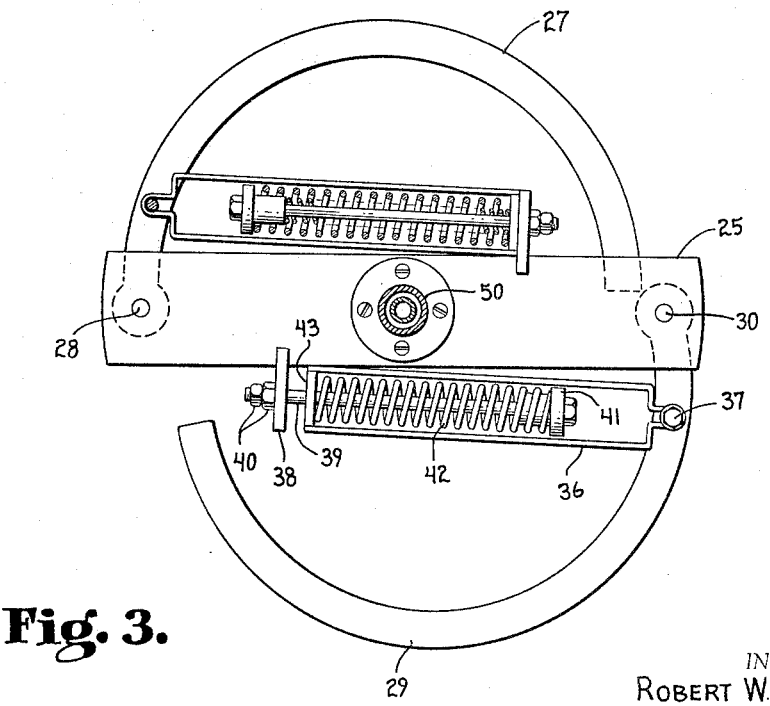
FIG. 3 is an enlarged view taken on line 3—3 of FIG. 1.
Figure 5:
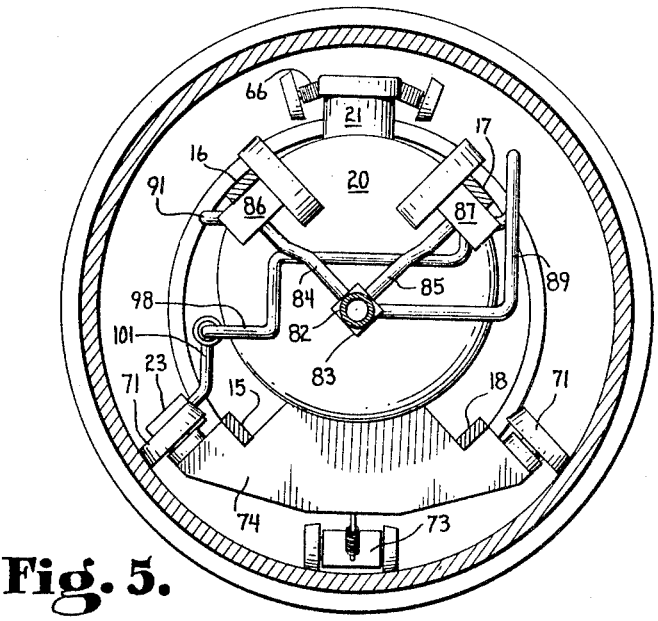
FIG. 5 is a cross-section taken on line 5—5 of FIG. 1.
Figure 6:
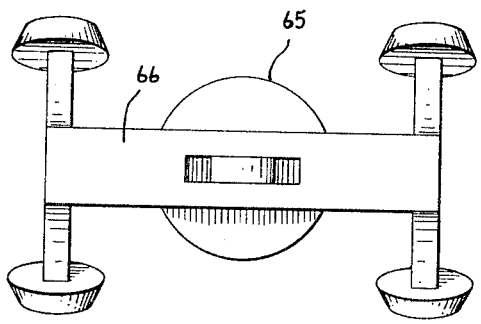
FIG. 6 is a top plan view of the locking mechanism.
Figure 7:
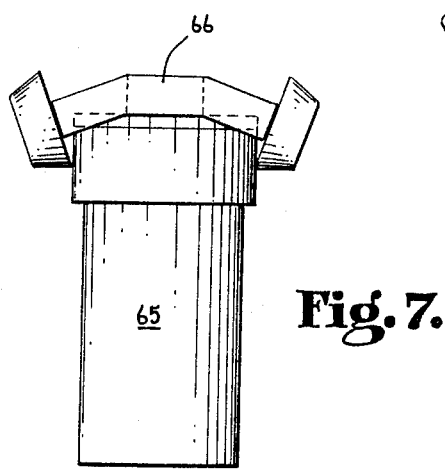
FIG. 7 is a side elevation of the locking mechanism of FIG. 6.

The arms 27 are normally biased to a retracted position as shown in FIG. 2. For providing such biasing a yoke member 36 may be attached to each arm adjacent its pivoted end by means of a bolt 37. A bracket 38 may be welded or otherwise fastened to plate 25 and an elongated bolt 39 may be attached to the bracket 38 by means of a pair of nuts 40. The free end of bolt 39 includes a washer 41 and a biasing spring 42 may be compressed between washer 41 and the base portion 43 of the yoke 36. FIG. 3 illustrates arm 27 in its retracted position, while arm 29 is illustrated in the position which it assumes when the brush mechanism is rotated, and centrifugal force acts on the arm to cause compression of spring 42.

The cleaning head also includes means for distributing cleaning fluid and air onto the interior surface of the pipe joint which means consists of an annular manifold 45 having an annular chamber 46 therein and a plurality of radially projecting nozzles 47 for conducting fluid and/or air out of chamber 46. The manifold may be bolted or otherwise attached to plate 26 in concentric relation to the brush structure. For rotatably supporting the brush structure and the manifold there is provided a tubular shaft 50 mounted to the disc 12 by means of a conventional bearing assembly 51. The shaft 50 extends through the plates 25 and 26, and they are fixed to the shaft by any suitable conventional means. At the outer end of shaft 50 there is provided a fluid coupling 52 having a hose 53 attached thereto and connected at 54 to the manifold 45 so that fluid or air may flow through the shaft and into the manifold. The opposite end of shaft 50 is coupled to a piping system by means of a conventional coupling device 55. For rotating the entire cleaning head there is provided, by way of example, an air operated motor 57 mounted to frame members 15 and 16 by means of a bracket 56, and having a drive sprocket 58 which drives sprocket 59, fixed to shaft 50, through chain 60, idler sprockets 61 and 62 and chain 63. Preferably, the chain and sprocket drive system provides a speed reducing drive.

For locking the entire pipe cleaning apparatus to the pipe 64 while the cleaning head is rotating, there is provided an air operated ram 65, the piston of which is connected to a head member 66 whereby operation of the ram forces the head 66 into engagement with the interior surface of the pipe with sufficient pressure to prevent the frame structure 10, 11, 12, 14, 15 and 16 from rotating with respect to the pipe. The ram 65 is mounted between the frame members 16 and 17 by means of a bracket 67.

The frame structure of the cleaning apparatus includes a chassis consisting of a pair of longitudinal members 70, each of which is mounted or attached to one of the frame members 15, 18. Wheels 71 are rotatably mounted on each of the members 70 for engagement with the pipe surface so that the cleaning apparatus may be rolled through the pipe.

An electromagnetic joint locating device 73 is attached to chassis members 70 by means of bracket members 74, a turnbuckle 75 and a spring 76. The pipe joint locating device 73 is illustrated in detail in my copending application, Serial No. 152,736, filed November 16, 1961. My United States Letters Patent No. 2,896,155, "Pipe Joint Locating Device," granted July 21, 1959, also discloses a pipe joint locating means which can be used as illustrated at 73 in FIG. 1.

Figure 4:
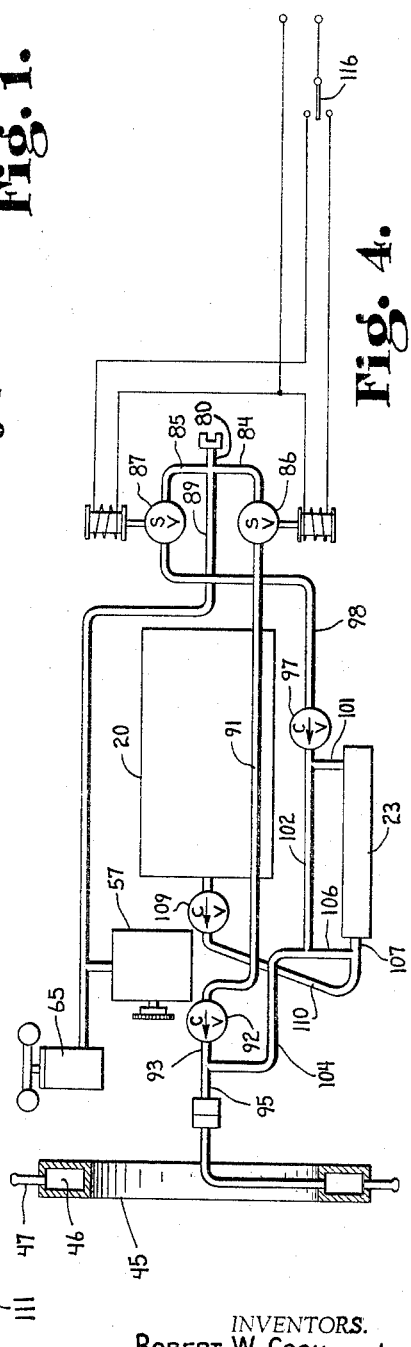
FIG. 4 is a schematic diagram illustrating the fluid and air supply system as incorporated in the apparatus illustrated in FIG. 1.

Referring to FIGS. 1 and 4, the piping system previously referred to herein consists of input pipe connection 80 mounted concentrically of disc 10 and fixed thereto by means of a flange 81. The inner end 82 of pipe 80 is threaded, as shown, to receive a three-way coupling 83 to which are coupled pipes 84 and 85 leading to electromagnetically operated valves 86 and 87, respectively, and to which is also coupled pipe 89 leading to air motor 57 and the locking ram 65. From valve 86 there is connected a pipe 91 to which is connected a check valve 92. Valve 92 is connected by pipe 93 to a T-connection 94, one branch of which is connected to the tubular shaft 50 by means of pipe 95. Valve 87 is connected to a check valve 97 by means of a pipe 98, and check valve 97, in turn, is connected by pipe 99 to a T-connection 100, one branch of which is connected to the reservoir 23 by means of pipe 101. The other branch of T-connection 100 is connected through pipe 102 to a T-connection 103. One branch of T-connection 103 is connected by pipe 104 to the T-connection 94. The other branch of T-connection 103 is connected to a T-connection 105 by means of pipe 106. The outlet of reservoir 23 is connected to one branch of T-connection 105 by pipe 107. The supply tank 20 is connected by a check valve 109 and pipe 110 to the T-connection 105.

In operation, the cleaning apparatus as provided herein is used for cleaning pipe joints prior to application of the seals thereto by means of the apparatus illustrated in U.S. Letters Patent No. 2,894,539. As described in that patent, an excavation is made to expose the pipeline at one particular section thereof. The exposed pipe section may be removed, and the cleaning apparatus may be inserted within the pipe for movement along the pipe in either direction from the excavation. The joint locating apparatus 73 operates in the manner described in the aforementioned patent so that the cleaning head may be aligned with each pipe joint such as shown at 111.

The fluid and air supply system is idle during the joint locating phases of the operation. Valves 86, 87, 92 and 97 are normally closed. Valve 109 is normally open in response to liquid pressure within the supply tank 20 and thus the reservoir 23 is full of cleaning fluid. When a joint is located, air under pressure is supplied through the pipe 80 and pipe 89 to operate the air motor 57 and the locking ram 65 whereby the piston of locking ram 65 moves the head 66 into engagement with the pipe. Operation of the air motor causes the cleaning head to rotate, and the centrifugal force causes the brush arms 27 and 29 to pivot outwardly and engage the brushes 32 with the joint area of the pipe. The cleaning apparatus may be moved back and forth to cause the brushes to engage a substantial area of the pipe surface adjacent the joint, thereby to remove rust or other foreign material.

Valves 86 and 87 are selectively operable by switch 116 which would be located at the excavation. If it is desired to blow removed rust and other foreign material from the joint area, switch 116 may be operated to open valve 86, whereby air under pressure is fed from pipe 84 through pipe 91 to force check valve 92 to its open position. Air will then be fed through pipe 93 and shaft 50 through tube 53 into the manifold 45. Since the manifold is rotating, the nozzles 47 will eject air over the joint area to blow the removed rust and other materials away from the joint area.

To clean oil or other soluble films from the joint area, switch 116 may be operated to energize and open valve 87. At the same time valve 86 is deenergized and closed. Valve 87 opens to admit air from pipe 85 through pipe 98 to open check valve 97. This impresses air pressure through pipe 101 into reservoir 23 whereby the cleaning fluid in the reservoir is forced out of the reservoir and into pipe 106. Pressure is simultaneously impressed on pipe 110 and check valve 109 to close it. Since air also flows through pipe 102, a mixture of cleaning fluid and air flows through pipe 104 and through pipe 95 into shaft 50 and through tube 53 into the manifold 45. The nozzles 47 eject the air and fluid mixture on to the area surrounding the pipe joint. Simultaneously the brushes are scouring the pipe joint area and, thus, any soluble films are removed from the pipe joint area.

After the supply of fluid in the reservoir is exhausted, air continues to flow into the manifold and through the nozzles so that the pipe joint area may be dried. The cleaning operation may be terminated after a predetermined time period which can be determined from experience.

From the foregoing it will be apparent that the cleaning apparatus may be moved from one joint to another, after which the joint sealing apparatus of Patent No. 2,894,539 may be utilized for applying a seal to each pipe joint.

The invention claimed is:

1. Apparatus for cleaning the interior surface of an underground pipe comprising a frame structure, a rotatable cleaning head mounted on one end of said frame structure, a motor mounted within said frame structure and coupled to said head for driving it, means mounted on said frame for engaging said pipe and locking said frame to said pipe upon rotation of said cleaning head, said cleaning head comprising a plurality of brushes and means pivotally mounting said brushes for movement outwardly of said head in response to rotation of the head, said brush mounting means comprising at least one curved arm having one end pivoted to said head inwardly of the head periphery and the other end free for movement outwardly of said head, and a spring connected between said arm and said head in tension normally to bias said arm to a retracted position within the periphery of said head.

2. Apparatus for cleaning the interior surface of an underground pipe comprising a frame, a fluid storage tank supported within said frame for carrying a relatively large supply of cleaning fluid, a fluid reservoir supported within said frame in gravity flow relation to said tank for carrying a relatively small supply of fluid sufficient to clean a limited area of the surface of said pipe, a cleaning head mounted on one end of said frame and including brush structure for scouring said area and nozzles directed outwardly for applying a fluid stream on to said area, means for rotating said cleaning head, a piping system connecting said storage tank, said reservoir and said nozzles for supplying fluid from the storage tank to the reservoir and from the reservoir to the nozzles, a source of air pressure coupled to said piping system, selectively operable control valves in said piping system for applying air pressure to said reservoir for supplying fluid to said nozzles or for supplying air to said nozzles, and check valves in said piping system for isolating said storage tank during supply of air or fluid to said nozzles, for isolating said source of air from said nozzles when fluid is supplied thereto, and for isolating said reservoir from said source of air when one of said control valves is closed.

3. The invention according to claim 2 wherein said piping system includes a first pipeline connected between said source of air pressure and said nozzles, one of said control valves being connected in said pipeline and one of said check valves being connected between said one control valve and said nozzles, a second pipeline including said reservoir connected between said source of air pressure and said nozzles, the other of said control valves being connected in said second pipeline and another of said check valves being connected between said other control valve and said reservoir, said check valves being operative to prevent flow of fluid from said reservoir toward said source of air, and a third pipeline connected between said reservoir and said tank, said third pipeline including another of said check valves operative to pass flow of fluid from said tank to said reservoir and to block flow of fluid from said reservoir to said tank.

4. Apparatus for cleaning the interior surface of an underground pipe comprising a frame structure, a reservoir for storing a quantity of cleaning fluid supported within said frame structure, a rotatable cleaning head mounted at one end of said frame structure, means for rotating said head, said head comprising a plurality of brush members pivotally mounted to said head for movement outwardly of said head when it rotates, and a fluid distributing means fixed to said head adjacent said brush members and comprising an annular manifold having a plurality of spaced nozzles directed radially outward thereof, means for conducting fluid from said reservoir to said distributing means, and control means including a pressure source of air coupled to said reservoir to exert pressure on the surface of the fluid in the reservoir for initiating flow of fluid from said reservoir to said distributing means.

References Cited by the Examiner

UNITED STATES PATENTS

| | | |
|---|---|---|
| 2,017,042 | 10/1935 | Dougherty. |
| 2,727,263 | 12/1955 | Dangremond et al. ___ 15—179 X |
| 2,894,539 | 7/1959 | Cook et al. |
| 3,004,278 | 10/1961 | Stanley _____ 15—104.09 X |
| 3,056,155 | 10/1962 | Harmes _____ 15—104.12 X |
| 3,058,137 | 10/1962 | Doyle et al. _____ 15—104.12 X |
| 3,071,107 | 1/1963 | Stanley _____ 118—317 X |
| 3,078,823 | 2/1963 | Cummings et al. __ 15—104.09 X |
| 3,106,735 | 10/1963 | Landrum et al. ___ 15—104.14 X |

CHARLES A. WILLMUTH, *Primary Examiner.*

EDWARD L. ROBERTS, *Assistant Examiner.*